US009043593B2

(12) United States Patent
Rodniansky

(10) Patent No.: US 9,043,593 B2
(45) Date of Patent: May 26, 2015

(54) SESSION ATTRIBUTE PROPAGATION THROUGH SECURE DATABASE SERVER TIERS

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

(*) Notice: Subject to any disclaimer, the term of this patent is extended or adjusted under 35 U.S.C. 154(b) by 107 days.

(21) Appl. No.: 13/793,877

(22) Filed: Mar. 11, 2013

(65) Prior Publication Data

US 2014/0258715 A1 Sep. 11, 2014

(51) Int. Cl.
*H04L 29/06* (2006.01)
*G06F 21/00* (2013.01)

(52) U.S. Cl.
CPC .................................. *H04L 63/0428* (2013.01)

(58) Field of Classification Search
CPC .............. H04L 63/0428; H04L 9/0861; H04L 63/0471; H04L 9/08; H04L 63/0435; H04L 63/0442
See application file for complete search history.

(56) References Cited

U.S. PATENT DOCUMENTS

| 6,986,060 | B1 | 1/2006 | Wong |
| 7,426,512 | B1 | 9/2008 | Ben-Natan |
| 2006/0195687 | A1 | 8/2006 | Klein et al. |
| 2008/0219445 | A1 | 9/2008 | Yato et al. |
| 2010/0131758 | A1 | 5/2010 | Ben-Natan |
| 2010/0132024 | A1 | 5/2010 | Ben-Natan et al. |
| 2011/0231649 | A1* | 9/2011 | Bollay et al. .................. 713/151 |
| 2012/0150880 | A1 | 6/2012 | Ben-Natan et al. |
| 2014/0040615 | A1 | 2/2014 | Bitan et al. |

FOREIGN PATENT DOCUMENTS

WO   WO 02/091700 A2   11/2002

OTHER PUBLICATIONS

"WebSphere Application Server V7: Session Management", IBM Corporation, www.ibm.com/redbooks/redp4580-0 . . . , 2009, 68 pages.
Burger, W., "Session-Based Secure Communication for Secure Xenix", IBM Corporation, TDB vol. 32, No. 9A, Feb. 1990, http://www.ip.com/pubview/IPCOM000099614D, IP.com Electronic Publication: Mar. 15, 2005, 6 pages.
International Search Report and Written Opinion dated Jun. 3, 2014 for International Application No. PCT/IB2014/059197, 8 pages.

* cited by examiner

*Primary Examiner* — Izunna Okeke
(74) *Attorney, Agent, or Firm* — Stephen J. Walder, Jr.; Jeffrey S. LaBaw

(57) ABSTRACT

Mechanisms are provided for handling a database client request. An encrypted database client request (DCR) is received, by an unsecure access local agent, from a client computing device as part of a session between the client computing device and a database data processing system. The unsecure access local agent retrieves a database session information (DSI) address corresponding to the session and generates a first unique identifiable key (UIK) based on a portion of the encrypted DCR. The unsecure access local agent generates a DSI mapping data structure that maps the first UIK to the DSI address. A secure access local agent of the database data processing system processes the encrypted DCR using the DSI mapping data structure.

26 Claims, 6 Drawing Sheets

SESSION ATTRIBUTE PROPAGATION THROUGH SECURE DATABASE SERVER TIERS

BACKGROUND

The present application relates generally to an improved data processing apparatus and method and more specifically to mechanisms for propagating session attributes through secure database server tiers.

Modern managed information environments are injecting ever increasing levels of security capabilities. At one time, cryptographic operations for safeguarding data were both time and computationally expensive. As a result, they were typically reserved for highly sensitive government and financial contexts. As processor speed rises and memory capacities increase, the ability to perform cryptographic operations, once only reserved to specialized, expensive hardware, is now commonplace in many applications. Conventional off the shelf applications embed cryptographic capabilities into software because it no longer creates a processing bottleneck to do so.

Further, as network capacities continue to rise, with increasing use of broadband (e.g., cable modem) Internet access and increasing popularity of WiFi capability (e.g. 802.11b/g/n wireless), the sheer quantity of data transmitted heightens the awareness that unencrypted transmissions (so called "plaintext") run an increasing risk of divulging sensitive information. There is an emerging tendency to encrypt most or all data during transmission because there are minimal perceived drawbacks to doing so. Accordingly, data in transit between a source and a destination is often encrypted.

SUMMARY

In one illustrative embodiment, a method, in a data processing system comprising a processor and a memory, for handling a database client request is provided. The method comprises receiving, by an unsecure access local agent of the data processing system, an encrypted database client request (DCR) from a client computing device as part of a session between the client computing device and the data processing system. The method further comprises retrieving, by the unsecure access local agent, a database session information (DSI) address corresponding to the session. In addition, the method comprises generating, by the unsecure access local agent, a first unique identifiable key (UIK) based on a portion of the encrypted DCR. Furthermore, the method comprises generating, by the unsecure access local agent, a DSI mapping data structure that maps the first UIK to the DSI address, and processing, by a secure access local agent of the data processing system, the encrypted DCR using the DSI mapping data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for propagating session attributes through secure database server tiers. As mentioned above, encrypted transmissions of data are ever increasing and are especially prevalent with regard to database accesses. That is, database accesses may be either secured (encrypted) or unsecured (unencrypted). The terms secure and unsecure as they are used herein to refer to the local agents are meant to identify whether or not the local agent works in conjunction with a cryptographic engine for encrypting/decrypting data, where unsecured access local agents operate with regard to plaintext or unencrypted data while secure access local agents operate in conjunction with a cryptographic engine and encrypted data. Monitoring of accesses to a database are different depending upon whether the database accesses are secured or unsecured.

An example of a database access monitoring mechanism for secured database accesses is described in commonly assigned and co-pending U.S. Patent Application Publication No. 2010/0131758, entitled "Nondestructive Interception of Secure Data in Transit," published May 27, 2010. With the mechanisms of the '758 U.S. patent application Publication, client requests are received via a network at an interface in an encrypted manner. A cryptographic operation is invoked at the database server tier to decrypt received database client requests (DCRs) and encrypt database server responses (DSRs). The secure access local agent (LA1), referred to in the '758 U.S. patent application Publication as a database monitor agent, intercepts plaintext DCRs and DSR data after the decryption or before encryption by a cryptographic operation without disrupting the main flow of the data between the database server and the client computing device. The secure access local agent (LA1) forwards intercepted plaintext DCR and DSR data to an external database monitor for further analysis.

Figure 1:
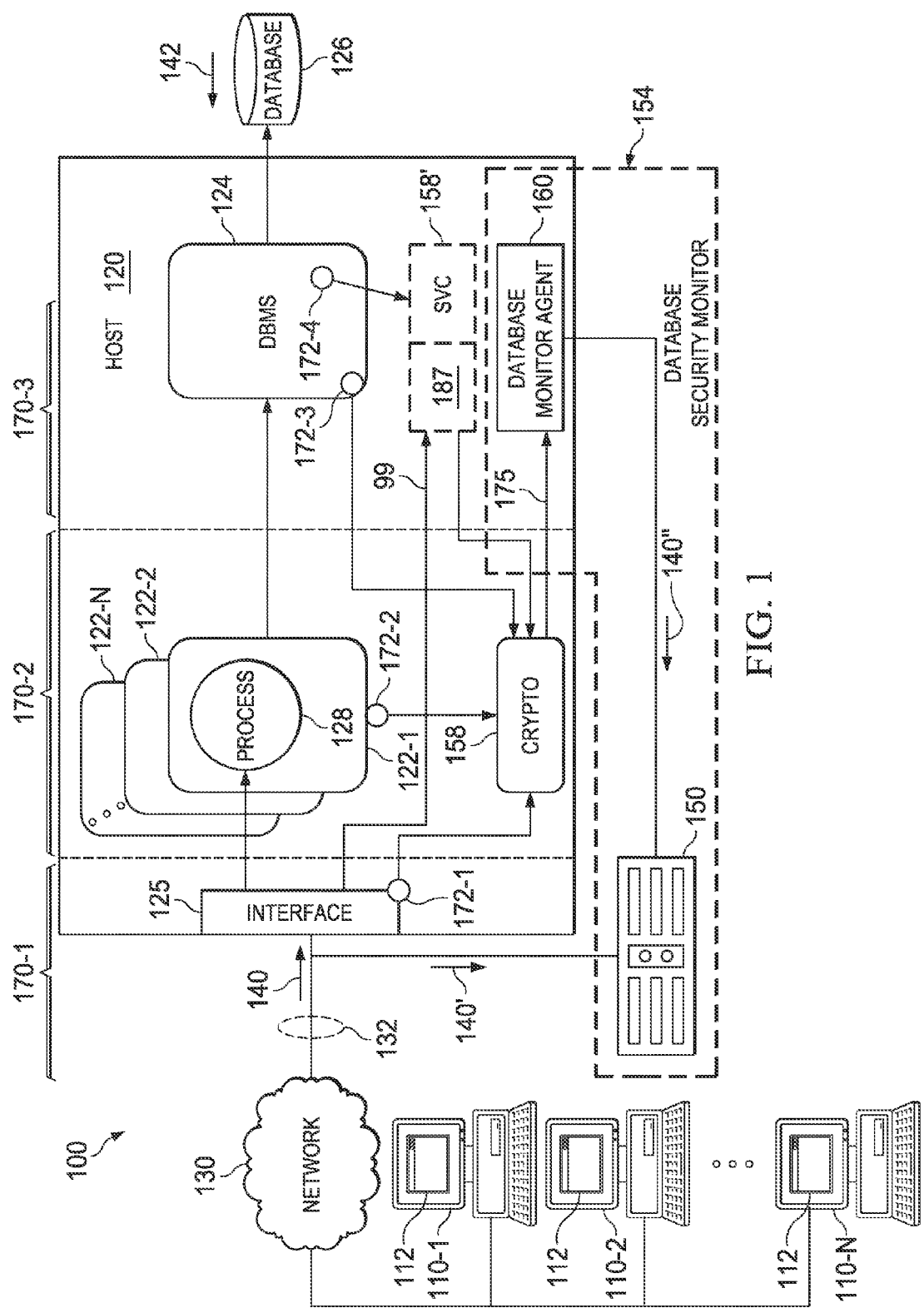
FIG. 1 is a context diagram of an exemplary managed information environment suitable for use with secured database accesses.

FIG. 1 is a context diagram of an exemplary managed information environment suitable for use with secured database accesses. Referring to FIG. 1, a managed information environment 100 includes user nodes 110-1 . . . 110-n (110 generally) coupled to a host 120 via a network 130. The user nodes 110 are typically PCs or other local computing devices having a graphical user interface (GUI) 112 operative to communicate interactively with the host 120. The host 120 provides services, such as data access and retrieval services, via a host application 122-1 . . . 122-n (122 generally) coupled to the counterpart GUI 112. The host application 122 includes coupling to one or more database server processes 128 for executing instructions to carry out delivery of the services to the user 110. In the exemplary configuration, the host application 122 is a database server coupled to a database management system (DBMS) 124 for providing data access and retrieval services to the user 110 via the database 126, thus the process 128 is a database server or agent process responsible for coupling the interface 125 with the DBMS 124.

A typical database environment 100 often employs a data level security mechanism 154. Such a data level security mechanism focuses on the data access transactions 140, 142 to and from the database, rather than a privilege or access control list at an invoking application 122. The data level security mechanism 154 may include an external database security monitor 150, a database monitor agent 160, or a combination of these, effectively defining the data level security mechanism (database monitor) 154.

As indicated above, security of the data in the database 126 is paramount. Accordingly, a database monitor 154 intercepts and scrutinizes the data access transactions 140, either by intercepting the transactions 140' over a network connection to an interface, or by the database agent 152 as transactions 140". For performance reasons, it is often sought to capture the access transactions 140 on the network connection 132, prior to the interface 125, to offload security processing from the host 120. However, as will be discussed further below, certain contexts also employ the database monitor agent 160, also referred to herein as secure access local agent (LA1), on the host 120.

As discussed above, many database management systems 124 encrypt data access transactions 140 to avoid exposure of sensitive data items while in transit from the an application GUI 112 to the database 126. Data access responses 142 may be similarly covered. However, the database monitor 124 (secure access local agent (LA1)) operates on plaintext (unencrypted) data. Accordingly, the database monitor 124 identifies an interception point 172-1 . . . 172-4 (172 generally) corresponding to the transition of ciphertext to plaintext, and captures the plaintext transaction 140" for scrutiny. Depending on the encryption employed by the particular DBMS 124, the interception point 172 may occur in one of several places. In the case of DBMS IPC interception (i.e. port read watching) shown as interception point 172-4, the interception point 172-4 is triggered by a port 187 read to read data passed from the interface 125 to the port 187 via arrow 99. The communication comes encrypted from the interface 125 and the service process (SVC) 158' decrypts the data by calling the cryptographic operation 158. It then passes the unencrypted data to the DBMS 124, which is where the actual interception occurs, discussed further below.

When the cryptographic operation for decryption 158 is invoked from the interface 125, an interprocess communication (IPC) mechanism is employed to intercept the database access transaction 140 at the interface 125 from the network connection 132, typically by a port read on a socket, shown in interception zone 170-1. The interception point 172-1 is a predetermined port employed by the DBMS 124 for receiving database access transactions 140, and is effected by watching or establishing an intercept triggered on the predetermined port. In this manner, operating system (OS) calls to read the ports corresponding to database transactions 140 result in the database monitor reading the port, scrutinizing the data, and passing it along as intended to the DBMS 124.

The interception occurs in zone 170-2 when a dynamically linked list (DLL) invocation to the cryptographic operation is employed. A call signature corresponding to the decryption operation 158 is superseded by inserting a database monitor call signature prior to the decryption operation at interception point 172-2, in zone 170-2. The DLL processing satisfies the linkage with the monitor signature 182 before the originally intended signature 180 of the cryptographic operation 158. The database monitor 152 invokes the cryptographic operation 158, scrutinizes the transaction 140, subsequently returns control.

In an end-to-end encryption scheme, the DBMS process 124 itself includes the invocation 172-3 to the decryption operation 158 via a static linkage. In this instance, the instructions in the executable image (the memory resident machine epodes) are examined to identify the invocation to the decryption operation, typically a stack call. The instructions are replaced with instructions to defer control to the database monitor 154, which then invokes the decryption operation 158 and scrutinizes the transaction 140.

An example of a database access monitoring mechanism for unsecured database accesses is described in U.S. Pat. No. 7,426,512 issued to Ron Ben-Natan on Sep. 16, 2008. As described in the '512 patent, a local client sends an access attempt to an interprocess communication (IPC) mechanism. An IPC intercept mechanism intercepts the access attempt and forwards it to an unsecure access local agent (LA2) which determines, by interrogating the IPC mechanism, a database instruction corresponding to the local access attempt. The unsecure access local agent (LA2) then transmits the determined database instruction to the external data security device for analysis and further operations by a database monitor. The external data security device also receives remote access attempts via a network switch/tap.

Figure 2:
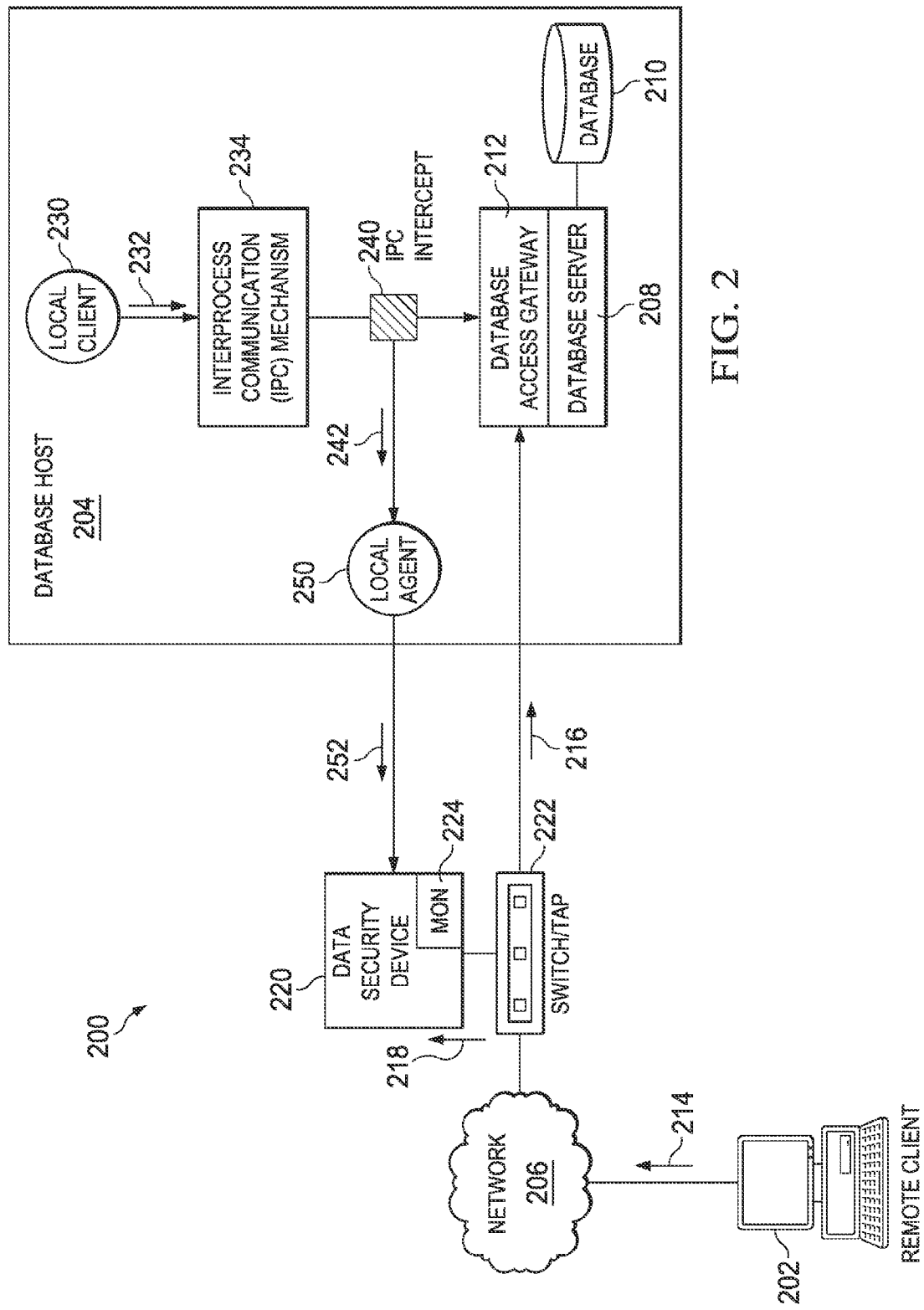
FIG. 2 is a context diagram of a data storage and retrieval environment suitable for use with unsecured database accesses.

FIG. 2 is a context diagram of a data storage and retrieval environment suitable for use with unsecured database accesses. Referring to FIG. 2, the environment 200 provides a remote user 202 with a database (DB) host 204 for data storage and retrieval operations (DB operations). The user 202 connects to the host 204 via an access network 206, which may be any suitable internetworking infrastructure such as a LAN, intranet, extranet or the Internet. The DB host 204 includes a database server 208 connected to the database 210, typically a disk array or set of mass storage devices such as disk drives. The database 208 includes a DB access gateway 212, which operates as an application programming interface (API) for user 202 access via a variety of access methods, discussed further below.

A user initiates access to the database 208 in the form of a user request 214, or database client request (DCR), which passes through the network 206 for delivery to the DB access gateway 212 as an incoming request 216. A data security device 220 is connected via a switch 222, or other connectivity device such as a tap, router or bridge, on the path from the network 206 to the host 204. The data security device 220 includes a DB monitor 224 for receiving user requests 214 sent through the switch 222. The DB monitor 224 receives and analyzes the incoming user request 214 as a tapped access attempt 218, which the DB monitor 224 analyzes according to a predetermined security or access policy. The data security device 220 then passes the tapped access attempt 218 to the access gateway (AG) 212 as an incoming request 216.

Typically, the database server 208 expects a substantial portion of DB traffic (user requests 214) to arrive remotely via the network 206, and thus pass scrutiny under the data security device 220. However, a portion of database access attempts emanate locally from a local client 230, executing on the host 204, as local access attempts 232. The local access attempts 232 arrive at the access gateway 212 via an Interprocess Communication (IPC) mechanism 234. Such local access attempts 232 do not pass through the switch 222, and therefore may otherwise be operable to elude scrutiny of the data security device 220.

This shortcoming is substantially overcome by employing an IPC intercept 240 for intercepting the local access attempt 232 and transporting the intercepted access attempt 242 to a local agent (LA2) 250. The local agent (LA2) 250 determines, by interrogating the IPC mechanism 234, a database instruction 252 corresponding to the local access attempts 232. The local agent (LA2) 250 then transmits the determined database instruction 252 to the data security device 220 for analysis and further operations by the DB monitor 224. In this manner, the data security device 220 receives all local and remote access attempts 232, 216 to the DB server 208 to more fully analyze, monitor, and guard against access attempts 232, 216 which may be undesirable.

It should be noted that the unsecure access local agent (LA2) in this case has access to database session information (DSI). Database session information (DSI) is information defining the establishment of the session between the client computing device and the database server. Examples of such DSI data comprises operation system user of the database client process, database client process identifier, terminal identifier, database client IP address and database client and database server ports. DSI data may be important data to analyze for purposes of intrusion detection. DSI information is available to the unsecure access local agent (LA2) because the inter process communication (IPC) mechanism uses operating system (OS) level standard application programming interfaces (APIs) and OS process identifiers are available to the unsecure access local agent. Since the OS process identifier is available, the DSI information can be retrieved using standard OS calls.

While secure databases obviously provide greater security of the data stored therein, the drawback of secure access local agent operations, such as described in the '758 U.S. patent application Publication, is that database session information (DSI) is not available to the database monitor agent or the database security monitor. This is because DSI is a data structure which does not participate in the execution flow of the processes within the database host server and is available only at the operating system level/tier which is at a different level/tier from the database monitor agent and database security monitor. While unsecured database local agent operations are able to have access to DSI data since the local agent receives access attempts only from local clients local to the database server host and may operate at a same tier/level as the operating system and IPC APIs, the unsecured database local agent operations are less secure than the secured database local agent.

Moreover, the unsecured database local agent generally cannot be used with secure database accesses because they are encrypted. That is, in the case of secure database accesses, the DCR and DSR, which may be intercepted by the unsecure access local agent (LA2), are encrypted and cannot be analyzed by an external security device (ESD) when they are forwarded by the unsecure access local agent (LA2) to the ESD. While the DCR and DSR are encrypted, the DSI data that is accessible by the unsecured local agent (LA2), collected from the operating system level, is not encrypted. Similarly, with the secure access local agent (LA1), the DSI data is not available at the point of invocation of the cryptographic operation and cannot be transferred to the ESD by the secure access local agent (LA1) for further analysis, however the DCR and DSR are not encrypted, due to interception after decryption (DCR), and before encryption (DSR), by the cryptographic operation, and can be forwarded to the ESD for further analysis.

The illustrative embodiments provide a mechanism by which these local agents LA1 and LA2 can be utilized together to allow DSI and decrypted DCR data to be provided to an external security device (ESD) for further analysis. The illustrative embodiments map decrypted data, intercepted at the cryptographic tier of a database server host, to database session attributes on the database server host at runtime. This allows DSI data to be available to the secure access local agent LA1, when it otherwise would not be available to the secure access local agent LA1 as discussed above, and solves the problem associated with the database session identification information for secure database access being made available to the ESD for intrusion detection analysis and operations when the DCR and DSR are encrypted.

With the mechanisms of the illustrative embodiments, database accesses are secure and thus, DCR and DSR are encrypted. However, the unsecure access local agent (LA2) is used to intercept the encrypted DCR and the non-encrypted, i.e. plaintext, DSI data, and then map the encrypted DCR data with the plaintext DSI data. The illustrative embodiments operate based on the observation that encryption keys used for data encryption are unique for each database session, e.g., each SSL handshake, and thus, the same database plaintext data from different sessions would result in different encrypted data due to the unique encryption keys used for each database session. Thus, a long enough binary string extracted from encrypted data is sufficiently random and unique in order to use it as a unique identifiable key (UIK) in multithreaded database session processing. Therefore, encrypted DCR data intercepted at the interprocess communication (IPC) tier of the unsecure access local agent (LA2) integrated with the IPC mechanisms can be mapped with unsecure DSI information using such a UIK, which in turn may be mapped to a session identifier (SI). The SI is a handle which identifies a session cryptographic context at the cryptographic level/tier.

As a result, the secure access local agent (LA1) which intercepts secure DCRs and invokes the cryptographic operations to decrypt the encrypted DCR data to generate plaintext DCR data, can retrieve the plaintext DSI data by virtue of the mapping generated by the unsecure access local agent (LA2). Thus, the unsecure access local agent (LA2) extracts the unique identifiable key (UIK) from the DCR. The unsecure access local agent (LA2) stores the UIK and DSI data in a DSI mapping data structure and makes it available to the secure access local agent (LA1). The secure access local agent (LA1) extracts the UIK from the DCR passed to it and performs a lookup operation in the DSI mapping data structure based on the UIK to identify the corresponding DSI data. As a result, the DSI data becomes available for the database session on the secure access local agent (LA1) tier. The secure access local agent (LA1) may then forward the plaintext DSI data and the plaintext DCR data to the external secure device (ESD).

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented.

Many modifications to the depicted environments may be made without departing from the spirit and scope of the present invention.

Figure 3:
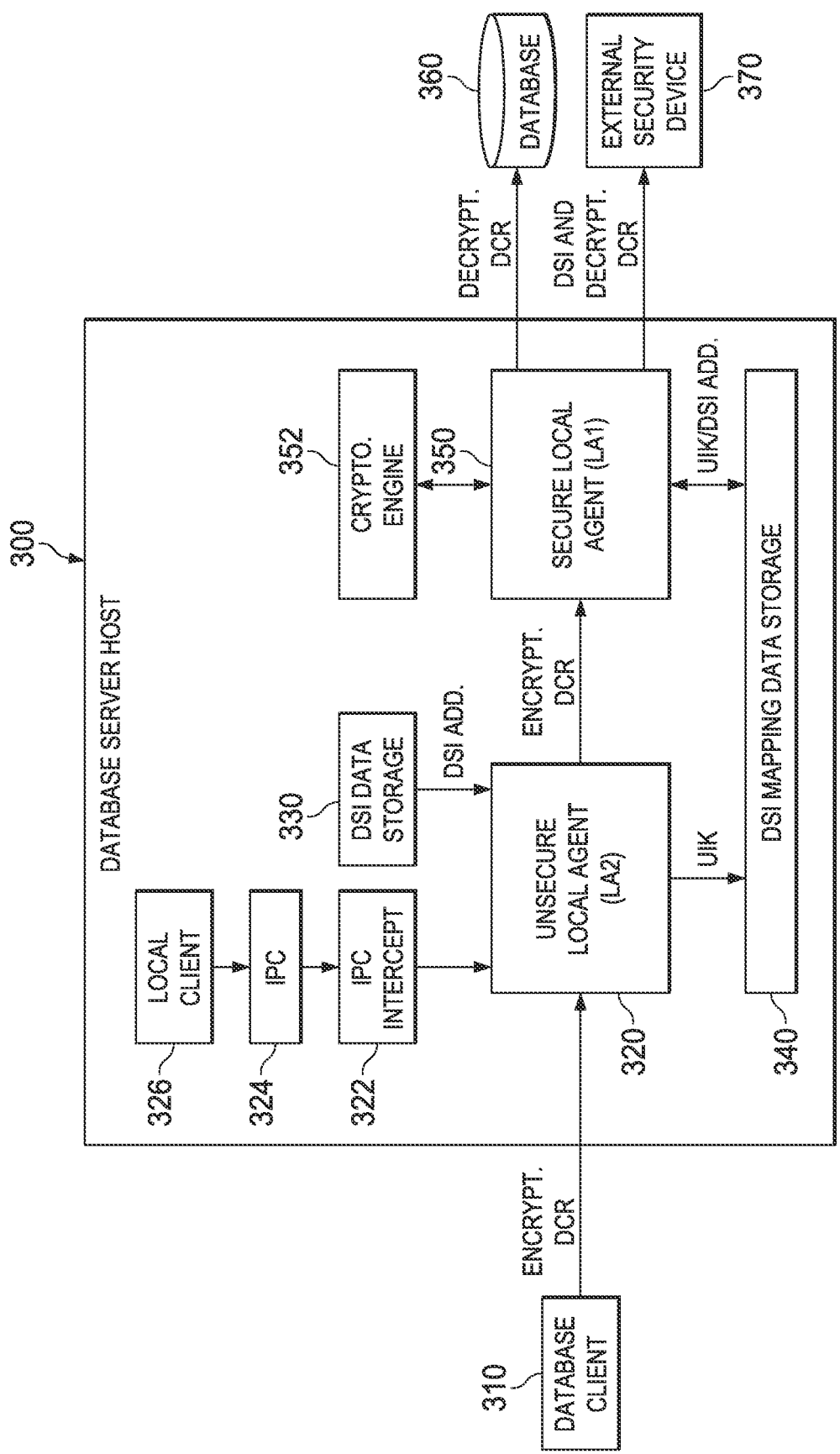
FIG. 3 is an example block diagram of a secure database system in accordance with one illustrative embodiment.

FIG. 3 is an example block diagram of a secure database system in accordance with one illustrative embodiment. As shown in FIG. 3, a database server host 300 comprises both an unsecure access local agent (LA2) 320 and a secure access local agent (LA1) 350. These agents are similar to the corresponding agents shown in FIGS. 1 and 2 above, but have been augmented with logic for implementing the additional operations and functionality described herein so as to generate and utilize entries in the DSI mapping data storage 340. Thus, while FIG. 3 refers to these local agents as local agents LA1 and LA2, this is done for ease of reference and correlation with FIGS. 1 and 2, but is not intended to state or imply that these local agents LA1 and LA2 are simply the same local agents as shown in FIGS. 1 and 2. They are similar, but have been significantly modified to implement the mechanisms of the illustrative embodiments.

As shown in FIG. 3, in a similar manner as described above with regard to FIG. 2, the unsecured local agent (LA2) 320 receives database access requests from a local client 326 via the interprocess communication (IPC) mechanism 324, which is software providing low level inter-process communication APIs. As explained previously, the IPC intercept 322 intercepts such database access requests and forwards them to the unsecure access local agent (LA2) 320 for processing.

The unsecure access local agent (LA2) 320 is referred to as being "unsecure" in that it is not configured to invoke or implement the cryptographic functions for decrypting a database client request (DCR), or encrypting a database server response (DSR) to a DCR, and may in fact be integrated with the IPC 324 and IPC intercept 322. The unsecure access local agent (LA2) 320 is further augmented, when compared to the local agent 250 in FIG. 2, to include logic for receiving DCRs from clients that are not local to the database server host 300 and may be external to the database server host 300, such as database client 310. Such DCRs may be received via one or more data networks, including routing mechanisms, such as switches, routers, etc. (not shown). As such, in order to ensure the security of the data in the database 360, such DCRs, and the corresponding DSRs sent back from the database server host 300, are encrypted. Thus, the database 360 is a secure database in which cryptographic processes, provided by cryptographic engine 352, for example, are used to protect the data being transmitted to and from the database server host 300.

The unsecured local agent (LA2) 320 is not configured to invoke the cryptographic engine 352 and thus, is not able to convert received encrypted DCRs into plaintext (decrypted) DCRs for processing. Thus, the unsecured local agent (LA2) 320 cannot perform functions on the encrypted DCRs for purposes of providing decrypted DCRs to the backend database 360 or to an external security device 370 for further analysis and security operations, such as logging the access to the database, performing operations to block/allow such requested access, modifying the data returned in the DSR from the database 360, or the like.

However, in accordance with the illustrative embodiments, the unsecured local agent (LA2) 320 comprises additional logic for extracting or generating a unique identifiable key (UIK) based on the encrypted DCR. This logic takes a subset of the encrypted data in the DCR as the UIK. That is, because the encryption keys used for each session with the database are considered unique to that session, a suitably long enough subset of the data in the DCR will be unique to that session. In other words, if two different sessions submitted the same exact request to the database server host 300, at least by virtue of the unique encryption/decryption keys used for each session, the encrypted DCRs are different.

The UIK may be extracted or generated in a number of different ways. Simply extracting a portion of the encrypted DCR at a designated location within the DCR may be used as a basis for extracting the UIK from the DCR. The UIK may have various sizes and thus, may be a different subset of the encrypted DCR depending upon the particular implementation. For example, in one illustrative embodiment, the UIK may be an 8 byte subset or portion of the encrypted DCR. Thus, the UIK is an encrypted pattern of data extracted from an encrypted DCR and is unique to the particular session between the client computing device and the database server host 300.

The UIK that is extracted from the encrypted DCR by the unsecured local agent (LA2) 320 is correlated with the database session information (DSI) for the session between the client computing device 310 and the database server host 300. This correlation is made between the UIK and the DSI address which points to the actual DSI data for the session stored in the DSI data storage 330. The mapping of UIK to DSI address is stored, by the unsecure access local agent (LA2) 320, in an entry in a DSI mapping data storage 340. Thus, the DSI mapping data storage 340 allows one to map an encrypted DCR, as identified by the UIK, with unencrypted DSI data in the DSI data storage 330 for the session.

It should be appreciated that in the description of FIG. 3, it is assumed that client computing devices, such as database client 310, implement a known handshake operation for setting up a session between the database client computing device 310 and the database server host 300. As part of this handshake operation, database session information (DSI) is collected and stored in a DSI data store 330 for each of the sessions with each of the client computing devices. As noted above, this DSI data may include such information as operating system user of the database client process, database client process id, terminal id, database client IP address, database server ports, or other information defining the connection between the client computing device 310 and the database server host 300. This data is collected at the operating system level and thus, is generally not available to the cryptographic or security level of the database server host 300, at which the cryptographic engine 352 and secure access local agent (LA1) 350 operate.

Returning again to the operation of the unsecure access local agent (LA2) 320, the unsecure access local agent (LA2) 320, since it is unable to invoke, or intercept invocations of, the cryptographic processes of the cryptographic engine 352, cannot perform the decryption of the encrypted DCR. To the contrary, the database server calls the secure access local agent (LA1) 350 and provides the received encrypted DCR to the secure access local agent (LA1) 350. The secure access local agent (LA1) 350 is similar to the local agent 160 in FIG. 1 but is augmented to include logic for extracting a UIK from the encrypted DCR and performing a lookup operation in the DSI mapping data storage 340 based on the UIK to obtain the DSI address for the unencrypted (plaintext) DSI data. Thus, the secure access local agent (LA1) invokes the cryptographic processes of the cryptographic engine 352 to decrypt the received encrypted DCR to generate a decrypted DCR, in a manner generally known in the art.

At substantially a same time as the cryptographic processes are being invoked by the database server, the secure access local agent (LA1) 350 intercepts the invocation and extracts the UIK from the encrypted DCR in a similar manner as was done by the unsecure access local agent (LA2) 320. Thus, both the unsecure access local agent (LA2) 320 and the secure access local agent (LA1) 350 implement the same logic for extracting the UIK from the encrypted DCR. As a result, the UIK extracted by unsecure access local agent (LA2) 320 and the UIK extracted by the secure access local agent (LA1) 350 should be identical, thereby allowing the lookup of DSI address information in the DSI mapping data storage 340.

Based on the extracted UIK that is extracted by the secure access local agent (LA1) 350, the secure access local agent (LA1) 350 performs a lookup operation in the DSI mapping data storage 340 and retrieves the DSI address corresponding to the UIK. Thus, by virtue of the decryption of the encrypted DCR performed by the cryptographic engine 352, and the retrieval of the DSI address from the DSI mapping data storage 340 based on the extracted UIK, the secure access local agent (LA1) 350 has access to both the decrypted DCR and the unencrypted DSI data in the DSI data storage 330 pointed to by the retrieved DSI address. Hence, the secure access local agent (LA1) 350 forwards the decrypted DCR to the database 360 so that the requested data may be retrieved from the database 360 and a corresponding database server response (DSR) may be returned to the database client 310, in a manner generally known in the art, assuming that such a DSR is not blocked by security mechanisms due to intrusion detection or the like.

In addition, the secure access local agent (LA1) 350 forwards the decrypted DCR and plaintext DSI data to the external security device (ESD) 370 for further analysis and security operations. That is, the ESD 370 may process the DCR and DSI data to determine if any security policies established from the database system are violated by the DCR. Many times, in order to make such determinations, it is important to have the DSI data which gives information about the client computing device 310, the type of connection being used, and the like, that may have a bearing on whether a security policy is violated or not. For example, a database may store a table "SECRET INFORMATION" that has an associated security policy that the table can only be accessed by a user Alice and only from a computer with Internet Protocol address 192.168.1.175, for example. That is the ESD 370 may have a rule that is of the type "If user is not Alice or client ip address is not 192.168.1.175, then issue alert."

The security operations that may be performed may include, for example, allowing the database system to return the requested data in a DSR or blocking the return of the requested data if a violation of a security policy occurs. Moreover, the security operations may be more advanced and may anonymize data returned to the database client 310, modify the returned data before being returned to the database client 310, redirect the data to another location, log the database client request in a log data structure along with information about any security policy violations, send notifications to authorized individuals should a security policy violation occur, or the like. Any suitable security operation that may be performed based on whether or not a security policy is violated or not may be used without departing from the spirit and scope of the illustrative embodiment.

Thus, to summarize the operations described above, when an encrypted DCR is received by the database server host 300, it is received by the unsecure access local agent (LA2) 320 which extracts a UIK and correlates the UIK with the DSI address for the session and generates an entry in the DSI mapping data structure of the DSI mapping data storage 340 for mapping the UIK to the DSI address. The encrypted DCR is passed to the secure access local agent (LA1) 350 which again generates the UIK, performs a lookup of the UIK in the DSI mapping data structure to retrieve the DSI address, and invokes the cryptographic engine 352 to decrypt the DCR. The secure access local agent (LA1) 350 then provides the decrypted DCR and DSI to the ESD 370 and provides the decrypted DCR to the database 360. This allows the DSI data to be made accessible to the ESD 370 via the secure access local agent (LA1) 350 when it otherwise would not be available in prior art mechanisms.

Figure 4:
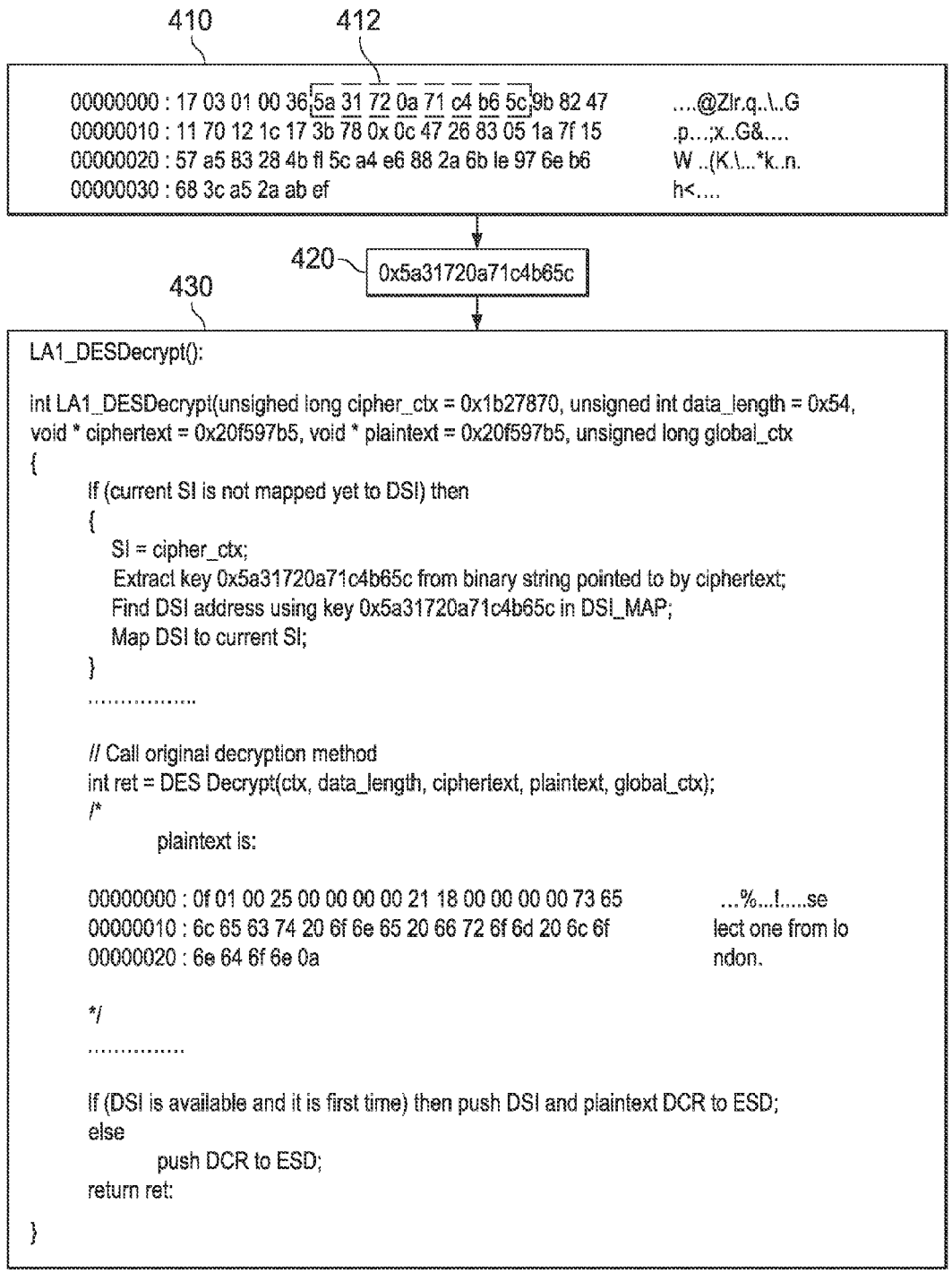
FIG. 4 is an example diagram illustrating the extraction of a unique identifiable key (UIK) from an encrypted database client request (DCR) and the mapping of the UIK with the database session information (DSI) address for a current session in accordance with one illustrative embodiment.

As mentioned above, one of the primary features of the illustrative embodiments is the ability to extract a unique identifiable key (UIK) from the encrypted database client request (DCR). FIG. 4 is an example diagram illustrating the extraction of a unique identifiable key (UIK) from an encrypted database client request (DCR) and the mapping of the UIK with the database session information (DSI) address for a current session in accordance with one illustrative embodiment. In FIG. 4, element 410 represent the encrypted database client request (DCR) packet having a string of symbols representing the encrypted data. In the particular example shown, the portion of the string "17 03 01 00 36" is part of the transport layer security (TLS) and indicates that the data is encrypted. In addition, in accordance with the TLS protocol, the header offset is 5 bytes indicating that the start of the encrypted data is at byte 6 of the data packet. In this particular example, the key is selected to be an 8 byte key that is extracted from the first 8 bytes of the encrypted data. This corresponds to the portion of the data packet 412.

Thus, the UIK 420 is extracted, by the unsecure access local agent (LA2), from the DCR data packet 410 for use in mapping with the DSI address. It is assumed, for purposes of this example, that the DSI data that is collected comprises the following:

DSI Address: 0x8057779
OS USER: admin
DB CLIENT PROCESS ID: 53871
TERMINAL ID: tty05
DATABASE CLIENT IP ADDRESS: 192.168.2.26
DATABASE CLIENT PORT: 13756
DATABASE SERVER PORT: 4100

The unsecure access local agent (LA2) generates an entry in a DSI mapping data structure (DSI_MAP) that maps the UIK/DSI address pair: (0x5a31720a71c4b65c, 0x8057779).

Element 430 in FIG. 4 represents the pseudocode that may be implemented by the secure access local agent (LA1) when decrypting the DCR, retrieving the DSI address, and providing the decrypted DCR and DSI data to the ESD. As shown in element 430 of FIG. 4, the secure access local agent (LA1) initializes the decryption of the encrypted DCR and retrieves the DSI from the DSI_MAP data structure and maps the DSI address to the current session information (SI). Thereafter, the secure access local agent (LA1) pushes the DSI data and the plaintext DCR to the ESD if the DSI is available and it is the first time the DSI data is being correlated with SI information (such correlation need only be performed the first time and this correlation may be reused in subsequent operations). If the DSI is not available, then only the plaintext DCR is sent to the ESD.

Figure 5:
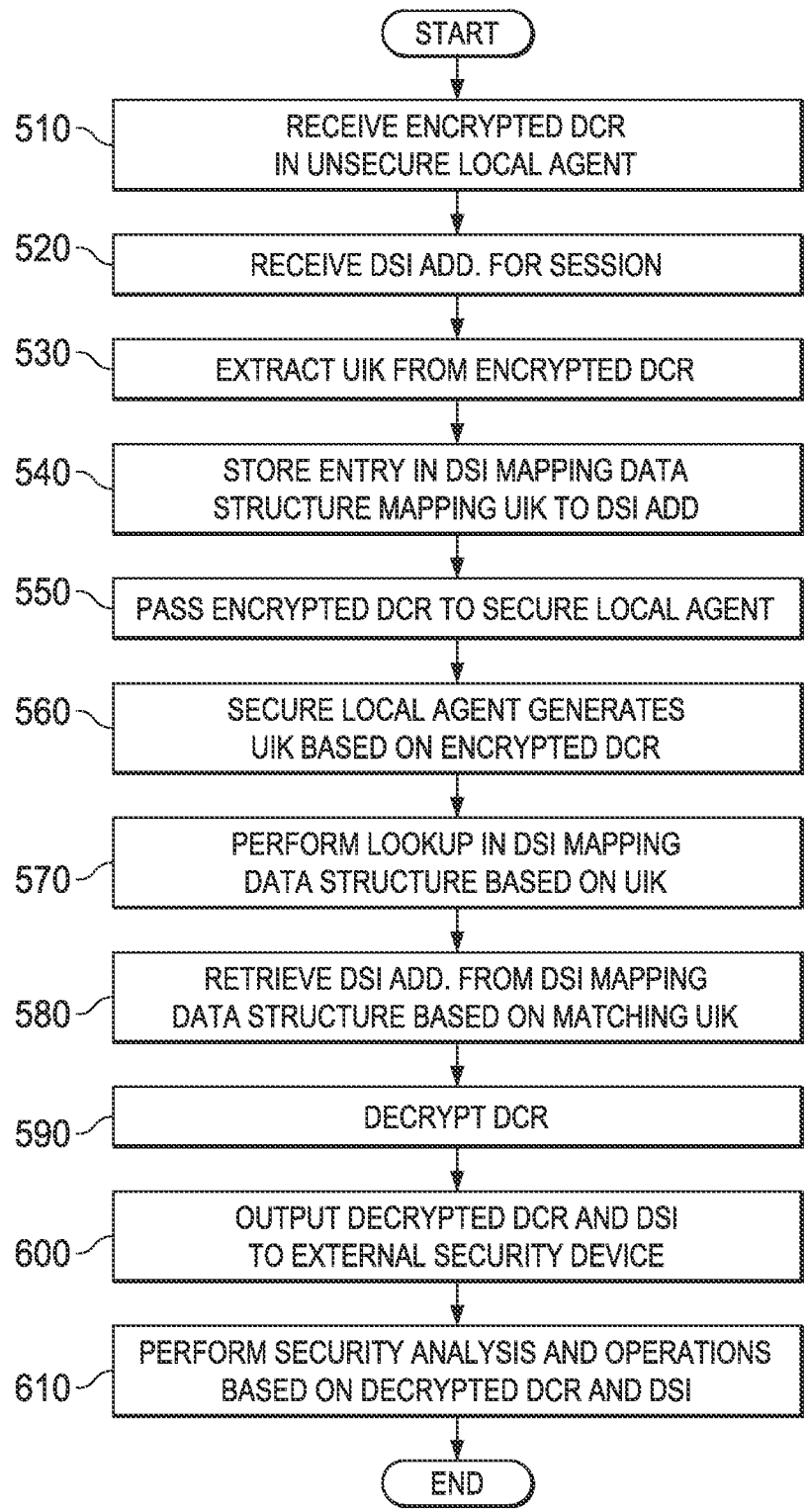
FIG. 5 is a flowchart outlining an example operation for handling an encrypted database client request (DCR) in a secure database system in accordance with one illustrative embodiment.

FIG. 5 is a flowchart outlining an example operation for handling an encrypted database client request (DCR) in a secure database system in accordance with one illustrative embodiment. As shown in FIG. 5, the operation starts by receiving an encrypted database client request (DCR) in the unsecure access local agent (LA2) (step 510). The database session information (DSI) address for the session is received by the unsecure access local agent (LA2) (step 520). The unsecure access local agent (LA2) extracts the unique identifiable key (UIK) from the encrypted DCR (step 530) and stores an entry in the DSI mapping data structure mapping the UIK to the DSI address (step 540). The encrypted DCR is then passed by the unsecure access local agent to the secure access local agent (step 550).

The secure access local agent generates the UIK based on the encrypted DCR (step 560) and performs a lookup of the UIK in the DSI mapping data structure to identify the corresponding DSI address (step 570). The DSI address is retrieved from the DSI mapping data structure based on the matching UIK (step 580) and the DCR is decrypted (step 590). The decrypted DCR and the plaintext DSI data is output to the external security device (step 600). The external security device then performs analysis and security operations based on the decrypted DCR and DSI (step 610). The operation then terminates.

Thus, the illustrative embodiments provide mechanisms for propagating session attributes, in the database session information, through a secure database server to an external security device. The illustrative embodiments overcome the problems associated with such session attributes not being available to the security tier or level of a secure database server in known architectures. The illustrative embodiments permit the secure access local agent to access these session attributes and provide them to the external security device along with the decrypted database client request.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 6:
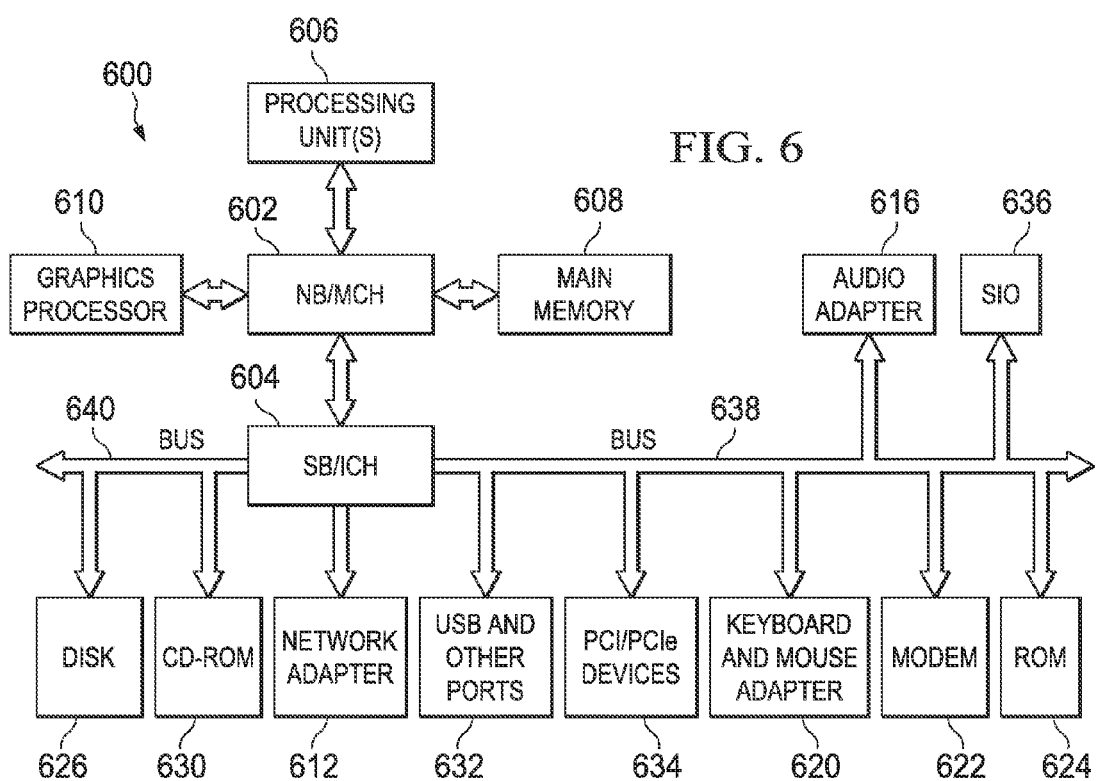
FIG. 6 is a block diagram of an example data processing system in which aspects of the illustrative embodiments may be implemented.

FIG. 6 is a block diagram of an example data processing system in which aspects of the illustrative embodiments may be implemented. Data processing system 600 is an example of a computer, such as database server host 300 in FIG. 3, in which computer usable code or instructions implementing the processes for illustrative embodiments of the present invention may be located.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a server, data processing system 600 may be, for example, an IBM® eServer™ System p® computer system, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed. An object-oriented programming system, such as the Java™ programming system, may run in conjunction with the operating system and provides calls to the operating system from Java™ programs or applications executing on data processing system 600.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

Those of ordinary skill in the art will appreciate that the hardware in FIG. 6 may vary depending on the implementation. Other internal hardware or peripheral devices, such as flash memory, equivalent non-volatile memory, or optical disk drives and the like, may be used in addition to or in place of the hardware depicted in FIG. 6. Also, the processes of the illustrative embodiments may be applied to a multiprocessor data processing system, other than the SMP system mentioned previously, without departing from the spirit and scope of the present invention.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for handling a database client request, comprising:

receiving, by an unsecure access local agent of the data processing system, an encrypted database client request (DCR) from a client computing device as part of a session between the client computing device and the data processing system;

retrieving, by the unsecure access local agent, a database session information (DSI) address corresponding to the session;

generating, by the unsecure access local agent, a first unique identifiable key (UIK) based on a portion of the encrypted DCR;

generating, by the unsecure access local agent, a DSI mapping data structure that maps the first UIK to the DSI address; and processing, by a secure access local agent of the data processing system, the encrypted DCR using the DSI mapping data structure, wherein generating the first UIK based on a portion of the encrypted DCR comprises:

extracting an encrypted portion of the encrypted DCR as an encrypted pattern unique to the session; and storing the extracted encrypted portion of the encrypted DCR as the first UIK.

2. The method of claim 1, wherein processing the encrypted DCR using the DSI mapping data structure comprises:

invoking, by the secure access local agent, a cryptographic process for decrypting the encrypted DCR; and retrieving, by the secure access local agent, in response to intercepting the invocation of the cryptographic process, the DSI address for the session based on the DSI mapping data structure.

3. A method, in a data processing system comprising a processor and a memory, for handling a database client request, comprising:

receiving, by an unsecure access local agent of the data processing system, an encrypted database client request (DCR) from a client computing device as part of a session between the client computing device and the data processing system;

retrieving, by the unsecure access local agent, a database session information (DSI) address corresponding to the session;

generating, by the unsecure access local agent, a first unique identifiable key (UIK) based on a portion of the encrypted DCR;

generating, by the unsecure access local agent, a DSI mapping data structure that maps the first UIK to the DSI address; and processing, by a secure access local agent of the data processing system, the encrypted DCR using the DSI mapping data structure, wherein processing the encrypted DCR using the DSI mapping data structure comprises:

invoking, by the secure access local agent, a cryptographic process for decrypting the encrypted DCR; and retrieving, by the secure access local agent, in response to intercepting the invocation of the cryptographic process, the DSI address for the session based on the DSI mapping data structure, and wherein retrieving the DSI address for the session based on the DSI mapping data structure comprises:

generating, by the secure access local agent, a second UIK based on the encrypted DCR;

performing a lookup operation in the DSI mapping data structure based on the second UIK to identify a matching entry in the DSI mapping data structure having a matching UIK that matches the second UIK; and retrieving a DSI address from the matching entry in the DSI mapping data structure.

4. The method of claim 3, wherein processing the encrypted DCR using the DSI mapping data structure further comprises using the DSI address to retrieve DSI data for the session.

5. The method of claim 4, wherein processing the encrypted DCR using the DSI mapping data structure further comprises:

forwarding the decrypted DCR, and DSI data corresponding to the DSI address, to a security device, wherein the security device analyzes the decrypted DCR and DSI data for security policy violations.

6. The method of claim 5, wherein the security device performs one or more security operations based on results of the analysis of the decrypted DCR and DSI data.

7. The method of claim 6, wherein the one or more security operations comprise at least one of authorizing a response from the data processing system to the client computing device, blocking a response from the data processing system to the client computing device, modifying a response from the data processing system, sending a notification to a user of the processing of the DCR, or generating a log entry corresponding to the processing of the DCR.

8. The method of claim 1, wherein the portion of the encrypted DCR extracted as an encrypted pattern unique to the session comprises a predetermined number of bytes of encrypted data of the DCR at a predetermined location in the encrypted DCR.

9. A computer program product comprising a computer readable storage medium having a computer readable program stored therein, wherein the computer readable program, when executed on a data processing system, causes the data processing system to:

receive, by an unsecure access local agent of the data processing system, an encrypted database client request (DCR) from a client computing device as part of a session between the client computing device and the data processing system;

retrieve, by the unsecure access local agent, a database session information (DSI) address corresponding to the session;

generate, by the unsecure access local agent, a first unique identifiable key (UIK) based on a portion of the encrypted DCR;

generate, by the unsecure access local agent, a DSI mapping data structure that maps the first UIK to the DSI address; and process, by a secure access local agent of the data processing system, the encrypted DCR using the DSI mapping data structure, wherein the computer readable program further causes the data processing system to generate the first UIK based on a portion of the encrypted DCR at least by:

extracting an encrypted portion of the encrypted DCR as an encrypted pattern unique to the session; and storing the extracted encrypted portion of the encrypted DCR as the first UIK.

10. The computer program product of claim 9, wherein the computer readable program further causes the data processing system to process the encrypted DCR using the DSI mapping data structure at least by:

invoking, by the secure access local agent, a cryptographic process to decrypt the encrypted DCR; and retrieving, by the secure access local agent, in response to intercepting the invocation of the cryptographic process, the DSI address for the session based on the DSI mapping data structure.

11. A computer program product comprising a computer readable storage medium having a computer readable program stored therein, wherein the computer readable program, when executed on a data processing system, causes the data processing system to:

receive, by an unsecure access local agent of the data processing system, an encrypted database client request (DCR) from a client computing device as part of a session between the client computing device and the data processing system;

retrieve, by the unsecure access local agent, a database session information (DSI) address corresponding to the session;

generate, by the unsecure access local agent, a first unique identifiable key (UIK) based on a portion of the encrypted DCR;

generate, by the unsecure access local agent, a DSI mapping data structure that maps the first UIK to the DSI address; and process, by a secure access local agent of the data processing system, the encrypted DCR using the DSI mapping data structure, wherein the computer readable program further causes the data processing system to process the encrypted DCR using the DSI mapping data structure at least by:

invoking, by the secure access local agent, a cryptographic process to decrypt the encrypted DCR; and retrieving, by the secure access local agent, in response to intercepting the invocation of the cryptographic process, the DSI address for the session based on the DSI mapping data structure, and wherein the computer readable program further causes the data processing system to retrieve the DSI address for the session based on the DSI mapping data structure at least by:

generating, by the secure access local agent, a second UIK based on the encrypted DCR;

performing a lookup operation in the DSI mapping data structure based on the second UIK to identify a matching entry in the DSI mapping data structure having a matching UIK that matches the second UIK; and retrieving a DSI address from the matching entry in the DSI mapping data structure.

12. The computer program product of claim 11, wherein the computer readable program further causes the data processing system to process the encrypted DCR using the DSI mapping data structure at least by using the DSI address to retrieve DSI data for the session.

13. The computer program product of claim 12, wherein the computer readable program further causes the data processing system to process the encrypted DCR using the DSI mapping data structure at least by:

forwarding the decrypted DCR, and DSI data corresponding to the DSI address, to a security device, wherein the security device analyzes the decrypted DCR and DSI data for security policy violations.

14. The computer program product of claim 13, wherein the security device performs one or more security operations based on results of the analysis of the decrypted DCR and DSI data.

15. The computer program product of claim 14, wherein the one or more security operations comprise at least one of authorizing a response from the data processing system to the client computing device, blocking a response from the data processing system to the client computing device, modifying a response from the data processing system, sending a notification to a user of the processing of the DCR, or generating a log entry corresponding to the processing of the DCR.

16. The computer program product of claim 9, wherein the portion of the encrypted DCR extracted as an encrypted pattern unique to the session comprises a predetermined number of bytes of encrypted data of the DCR at a predetermined location in the encrypted DCR.

17. A data processing system, comprising:

a processor; and a memory coupled to the processor, wherein the memory comprises instructions which, when executed by the processor, cause the processor to:

receive, by an unsecure access local agent of the data processing system, an encrypted database client request (DCR) from a client computing device as part of a session between the client computing device and the data processing system;

retrieve, by the unsecure access local agent, a database session information (DSI) address corresponding to the session;

generate, by the unsecure access local agent, a first unique identifiable key (UIK) based on a portion of the encrypted DCR;

generate, by the unsecure access local agent, a DSI mapping data structure that maps the first UIK to the DSI address; and process, by a secure access local agent of the data processing system, the encrypted DCR using the DSI mapping data structure, wherein the instructions further cause the processor to generate the first UIK based on a portion of the encrypted DCR at least by:

extracting an encrypted portion of the encrypted DCR as an encrypted pattern unique to the session; and storing the extracted encrypted portion of the encrypted DCR as the first UIK.

18. The data processing system of claim 17, wherein the instructions further cause the processor to process the encrypted DCR using the DSI mapping data structure at least by:

invoking, by the secure access local agent, a cryptographic process to decrypt the encrypted DCR; and retrieving, by the secure access local agent, in response to intercepting the invocation of the cryptographic process, the DSI address for the session based on the DSI mapping data structure.

19. A data processing system, comprising:

a processor; and a memory coupled to the processor, wherein the memory comprises instructions which, when executed by the processor, cause the processor to:

receive, by an unsecure access local agent of the data processing system, an encrypted database client request (DCR) from a client computing device as part of a session between the client computing device and the data processing system;

retrieve, by the unsecure access local agent, a database session information (DSI) address corresponding to the session;

generate, by the unsecure access local agent, a first unique identifiable key (UIK) based on a portion of the encrypted DCR;

generate, by the unsecure access local agent, a DSI mapping data structure that maps the first UIK to the DSI address; and process, by a secure access local agent of the data processing system, the encrypted DCR using the DSI mapping data structure, wherein the instructions further cause the processor to process the encrypted DCR using the DSI mapping data structure at least by:

invoking, by the secure access local agent, a cryptographic process to decrypt the encrypted DCR; and retrieving, by the secure access local agent, in response to intercepting the invocation of the cryptographic process, the DSI address for the session based on the DSI mapping data structure, and wherein the instructions further cause the processor to retrieve the DSI address for the session based on the DSI mapping data structure at least by:

generating, by the secure access local agent, a second UIK based on the encrypted DCR;

performing a lookup operation in the DSI mapping data structure based on the second UIK to identify a matching entry in the DSI mapping data structure having a matching UIK that matches the second UIK; and retrieving a DSI address from the matching entry in the DSI mapping data structure.

20. The data processing system of claim 19, wherein the instructions further cause the processor to process the encrypted DCR using the DSI mapping data structure at least by using the DSI address to retrieve DSI data for the session.

21. The data processing system of claim 20, wherein the instructions further cause the processor to process the encrypted DCR using the DSI mapping data structure at least by:

forwarding the decrypted DCR, and DSI data corresponding to the DSI address, to a security device, wherein the security device analyzes the decrypted DCR and DSI data for security policy violations.

22. The data processing system of claim 21, wherein the security device performs one or more security operations based on results of the analysis of the decrypted DCR and DSI data.

23. The data processing system of claim 22, wherein the one or more security operations comprise at least one of authorizing a response from the data processing system to the client computing device, blocking a response from the data processing system to the client computing device, modifying a response from the data processing system, sending a notification to a user of the processing of the DCR, or generating a log entry corresponding to the processing of the DCR.

24. The data processing system of claim 17, wherein the portion of the encrypted DCR extracted as an encrypted pattern unique to the session comprises a predetermined number of bytes of encrypted data of the DCR at a predetermined location in the encrypted DCR.

25. A database system, comprising:

a database server host system;

a database storage device coupled to the database server host system; and an external security device coupled to the database server host system, wherein the database host system is configured to implement an unsecure access local agent, a secure access local agent, and a cryptographic engine, and wherein the database server host system is further configured to:

receive, by the unsecure access local agent, an encrypted database client request (DCR) from a client computing device as part of a session between the client computing device and the data processing system;

retrieve, by the unsecure access local agent, a database session information (DSI) address corresponding to the session;

generate, by the unsecure access local agent, a first unique identifiable key (UIK) based on a portion of the encrypted DCR;

generate, by the unsecure access local agent, a DSI mapping data structure that maps the first UIK to the DSI address; and process, by a secure access local agent of the data processing system, the encrypted DCR using the DSI mapping data structure by performing a lookup operation in the DSI mapping data structure, using a second UIK generated by the secure access local agent based on the encrypted DCR, to retrieve the DSI address, and providing plaintext DSI data corresponding to the DSI address, and a decrypted DCR generated by the cryptographic engine based on the encrypted DCR, to the external security device for processing to detect security policy violations.

26. The method of claim 1, wherein the DCR is a request from the client computing device requesting access to data stored in the database.

* * * * *